US012804623B2

(12) United States Patent
Zheng et al.

(10) Patent No.: US 12,804,623 B2
(45) Date of Patent: Nov. 17, 2026

(54) METHOD AND APPARATUS FOR DETERMINING TIME-DOMAIN RESOURCE, AND COMMUNICATION DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Yi Zheng, Beijing (CN); Chunxia Guo, Beijing (CN); Yongchang Liu, Beijing (CN); Xiaoran Zhang, Beijing (CN); Fei Wang, Beijing (CN)

(73) Assignees: China Mobile Communications Co., Ltd Research Institute, Beijing (CN); China Mobile Communications Group Co., ltd., Beijing (CN)

( * ) Notice: Subject to any disclaimer, the term of this patent is extended or adjusted under 35 U.S.C. 154(b) by 247 days.

(21) Appl. No.: 18/724,355

(22) PCT Filed: Dec. 27, 2022

(86) PCT No.: PCT/CN2022/142514

§ 371 (c)(1),
(2) Date: Jun. 26, 2024

(87) PCT Pub. No.: WO2023/125573

PCT Pub. Date: Jul. 6, 2023

(65) Prior Publication Data

US 2025/0063548 A1 Feb. 20, 2025

(30) Foreign Application Priority Data

Dec. 30, 2021 (CN) ........................ 202111658145.7

(51) Int. Cl.
*H04W 72/04* (2023.01)
*H04W 72/044* (2023.01)
(Continued)

(52) U.S. Cl.
CPC ..... *H04W 72/0446* (2013.01); *H04W 72/046* (2013.01)

(58) Field of Classification Search
None
See application file for complete search history.

(56) References Cited

U.S. PATENT DOCUMENTS

2012/0076113 A1 3/2012 Proctor, Jr.
2021/0127389 A1 4/2021 Liu
(Continued)

FOREIGN PATENT DOCUMENTS

CN 110149699 A 8/2019
CN 110474733 A 11/2019
(Continued)

OTHER PUBLICATIONS

International Search Report and Written Opinion for corresponding PCT/CN2022/142514, mailed Mar. 14, 2023. (Chinese and English language document). (13 pages).
(Continued)

*Primary Examiner* — Maharishi V Khirodhar
(74) *Attorney, Agent, or Firm* — Maginot, Moore & Beck, LLP

(57) ABSTRACT

According to a method for determining a time-domain resource a network node receives a first signaling sent by a base station, wherein the first signaling is used to configure at least one time-domain resource. The at least one time-domain resource includes at least one of: at least one uplink time-domain resource for uplink forwarding or at least one downlink time-domain resource for downlink forwarding.
(Continued)

The network node receives a second signaling sent by the base station, wherein the second signaling is used to instruct the network node to forward on a first time-domain resource.

19 Claims, 4 Drawing Sheets

(51) Int. Cl.

| | |
|---|---|
| ***H04W 72/0446*** | (2023.01) |
| ***H04W 76/00*** | (2018.01) |
| ***H04W 88/08*** | (2009.01) |

(56) References Cited

U.S. PATENT DOCUMENTS

| | | | | |
|---|---|---|---|---|
| 2025/0016579 | A1 * | 1/2025 | Zhu | H04B 7/0695 |
| 2025/0063548 | A1 * | 2/2025 | Zheng | H04L 5/0005 |

FOREIGN PATENT DOCUMENTS

| | | | | |
|---|---|---|---|---|
| CN | 110719614 | A | 1/2020 | |
| CN | 110831187 | A | 2/2020 | |
| EP | 4444002 | A1 * | 10/2024 | H04B 7/15542 |
| WO | 2014110759 | A1 | 7/2014 | |
| WO | 2019/157936 | A1 | 8/2019 | |

OTHER PUBLICATIONS

Discussion on IAB node resource allocation, ZTE, R2-1807402, 3GPP TSG-RAN WG2 Meeting #102, May 21-25, 2018, Busan, Korea.

Search Report for corresponding EP application 22914825.9, mailed Oct. 23, 2025 (9 pages).

Office Action for corresponding CN application 202111658145.7, mailed Jan. 16, 2026 (Chinese and English language documents) (19 pages).

Qualcomm Incorporated, eMBB and URLLC dynamic multiplexing and preemption indication on the uplink, 3GPP TSG-RAN WG1 #92b, Apr. 16-20, 2018, R1-1804820 (11 pages).

* cited by examiner

METHOD AND APPARATUS FOR DETERMINING TIME-DOMAIN RESOURCE, AND COMMUNICATION DEVICE

CROSS REFERENCE TO RELATED APPLICATIONS

The disclosure is a U.S. national phase application of International Application No. PCT/CN2022/142514, filed on Dec. 27, 2022, which is based on and claims priority to Chinese patent application No. 202111658145.7, filed on Dec. 30, 2021, the entire contents of both of which are incorporated herein by reference for all purposes.

TECHNICAL FIELD

The disclosure relates to a field of wireless communication technology, and in particular, relates to a method and an apparatus for determining a time-domain resource, and a communication device.

BACKGROUND

Since smart repeaters only forward data, it is not clear how many users they serve. Similarly, the smart repeaters do not know when the base station will schedule users, because the smart repeaters do not parse physical downlink control channel (PDCCH) and data provided by the base station to users.

SUMMARY

A method for determining a time-domain resource provided by an embodiment of the disclosure includes:

- receiving, by a network node, a first signaling sent by a base station, in which the first signaling is used to configure at least one time-domain resource, the at least one time-domain resource includes at least one of: at least one uplink time-domain resource for uplink forwarding or at least one downlink time-domain resource for downlink forwarding; and
- receiving, by the network node, a second signaling sent by the base station, in which the second signaling is used to instruct the network node to perform forwarding on a first time-domain resource.

A method for determining a time-domain resources provided by an embodiment of the disclosure includes:

- sending, by a base station, a first signaling to a network node, in which the first signaling is used to configure at least one time-domain resource, the at least one time-domain resource includes at least one of: at least one uplink time-domain resource for uplink forwarding or at least one downlink time-domain resource for downlink forwarding; and
- sending, by the base station, a second signaling to the network node, in which the second signaling is used to instruct the network node to perform forwarding on a first time-domain resource.

A communication device provided by an embodiment of the disclosure, includes a processor and a memory, in which the memory is configured to store a computer program, and the processor is configured to call and execute the computer program stored in the memory, to perform any one of the methods for determining a time-domain resource above.

BRIEF DESCRIPTION OF THE DRAWINGS

The accompanying drawings here are incorporated into the specification and form a part of this specification, illustrating embodiments in accordance with the disclosure and used together with the specification to explain the principles of the disclosure.

DETAILED DESCRIPTION

The technical scheme in embodiments of the disclosure will be described clearly and completely in combination with the appended drawings in embodiments of the disclosure. It is obvious that the embodiments described are a part of embodiments in the disclosure, rather than present whole embodiments. On the basis of embodiments of the disclosure, all other embodiments obtained by those skilled in the art without creative work are within the protection scope of the disclosure.

Figure 1:
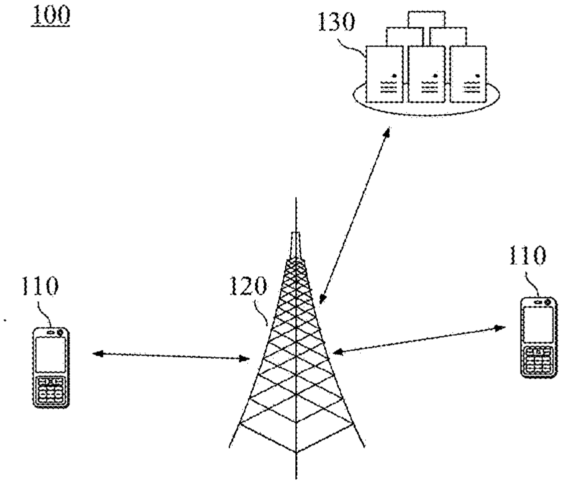
FIG. 1 is a schematic diagram of an optional application scenario according to an embodiment of the disclosure.

FIG. 1 is a schematic diagram of an application scenario according to an embodiment of the disclosure.

As shown in FIG. 1, a communication system 100 may include a terminal 110 and a network device 120. The network device 120 may communicate with the terminal 110 via an air interface. The terminal 110 and the network device 120 support multi-service transmission.

It should be understood that the communication system 100 in the embodiments of the disclosure is only illustrative, but the embodiments of the disclosure are not limited to this. That is to say, the technical solution of the embodiments of the disclosure can be applied to various communication systems, such as Internet of Things (IoT) systems, Narrow Band Internet of Things (NB-IoT) systems, enhanced Machine-Type Communications (eMTC) systems, 5G communication systems (also known as New Radio (NR) communication systems), or future communication systems.

In the communication system 100 shown in FIG. 1, the network device 120 may be an access network device that communicates with the terminal 110. The access network device can provide communication coverage for a specific geographic area and can communicate with terminals 110 (such as UEs) located within that coverage area.

The network device 120 may be a Next Generation Radio Access Network (NG RAN) device, or a base station (gNB) in NR systems, or a network device in future evolved Public Land Mobile Network (PLMN), and the like.

The terminal 110 may be any terminal, including but not limited to, a terminal connected to the network device 120 or other terminals via wired or wireless connection. For example, the terminal 110 may refer to an access terminal, user equipment (UE), user unit, user station, mobile station, mobile station, remote station, remote terminal, mobile device, user terminal, terminal, wireless communication device, user agent or user device. The access terminal may be a cellular phone, cordless phone, Session Initiation Protocol (SIP) telephone, IoT device, satellite handheld terminal, Wireless Local Loop (WLL) station, Personal Digital Assistant (PDA), Handheld device with wireless communication capabilities, computing device, or other processing device connected to wireless modems, vehicle mounted device, wearable device, terminal in 5G networks, or terminal in future evolved networks.

The terminal 110 may be used for Device to Device (D2D) communication.

The wireless communication system 100 may also include a core network device 130 that communicates with the base station. The core network device 130 may be a 5G Core (5GC) device, for example, an Access and Mobility Management Function (AMF), for another example, an Authentication Server Function (AUSF), for another example, User Plane Function (UPF), for another example, Session Management Function (SMF). In the process of network evolution, the above-mentioned core network device may also be called by other names, or new network entities may be formed by dividing the functions of the core network, which is not limited in embodiments of the disclosure.

The various functional units in the communication system 100 may also be connected through the next generation network (NG) interface to achieve communication.

For example, the terminal establishes an air interface connection with the access network device through the NR interface, and the air interface connection is used for transmitting user plane data and control plane signaling. The terminal can establish a control plane signaling connection with the AMF through NG interface 1 (N1 for short). The access network device, such as the gNB, can establish a user plane data connection with the UPF through NG interface 3 (N3 for short). The access network device can establish a control plane signaling connection with the AMF through NG interface 2 (N2 for short). The UPF can establish a control plane signaling connection with the SMF through NG interface 4 (N4 for short). The UPF can interact user plane data with a data network through NG interface 6 (N6 for short). The AMF can establish a control plane signaling connection with The SMF through NG interface 11 (N11 for short). The SMF can establish a control plane signaling connection with the PCF through NG interface 7 (N7 for short).

FIG. 1 illustrates a base station, a core network device, and two terminals as an example. Optionally, the wireless communication system 100 may include multiple base stations and each base station may include a different number of terminals within its coverage range, which is not limited by the embodiments of the disclosure.

It should be noted that FIG. 1 only illustrates the system to which the disclosure is applicable as an example. Of course, the method shown in the embodiments of the disclosure can also be applied to other systems. In addition, the terms "system" and "network" are often used interchangeably herein. The term "and/or" herein is only a description of the association relationship between associated objects, indicating that there may be three relationships, for example, A and/or B can indicate the presence of A alone, the presence of A and B simultaneously, and the presence of B alone. In addition, the character "/" herein generally indicates that the associated objects are in an "or" relationship. It should also be understood that the "indication" mentioned in the embodiments of the disclosure can be a direct indication, an indirect indication, or a representation of an association relationship. For example, "A indicates B" can represent that A directly indicates B, for example, B can be obtained through A; or can represent that A indirectly indicates B, for example, A indicates C, and B can be obtained through C; or can represent that there is an association relationship between A and B. It should also be understood that the term "corresponding to" mentioned in the embodiments of the disclosure can represent a direct or indirect correspondence between two elements, or can represent an association relationship between the two elements, which may be a relationship of indicating and being indicated, a relationship of configuring and being configured, and the like. It should also be understood that the "predefined" or "predefined rules" mentioned in the embodiments of the disclosure can be implemented by pre-storing corresponding codes, tables, or other means that can be used to indicate relevant information in devices (such as terminals and network devices), the specific implementation of which is not limited in embodiments of the disclosure. For example, those predefined can refer to those defined in a protocol. It should also be understood that in the embodiments of the disclosure, the "protocol" can refer to a standard protocol in the communication field, such as an NR protocol and related protocols applied in future communication systems, which is not limited in the disclosure.

For the convenience of understanding the technical solution of embodiments of the disclosure, the relevant technologies of the embodiments of the disclosure are explained below. The following related technologies used as optional solutions can be combined with the technical solution of the embodiments of the disclosure, and they all fall within the protection scope of the embodiments of the disclosure.

In order to make the network better provide coverage capability, especially for frequency range 2 (FR2), a millimeter wave signal of which is easily obstructed by vegetation and buildings, a more flexible and reliable coverage enhancement technology is required. The relevant solution proposes and standardizes a smart repeater technology.

Figure 2:
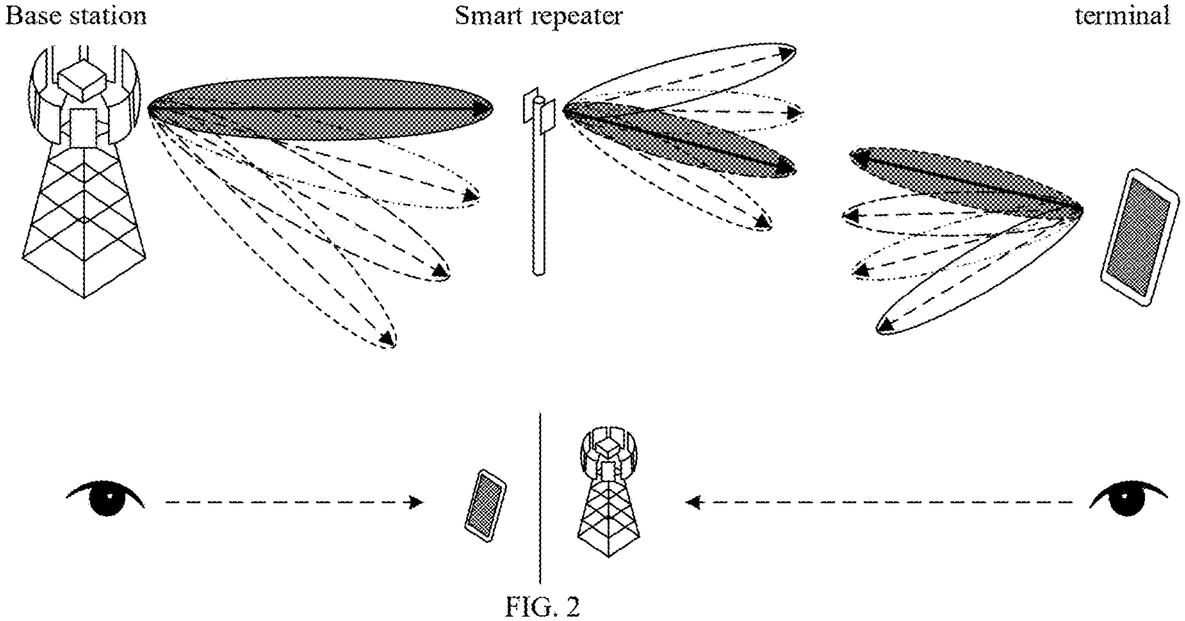
FIG. 2 is a schematic diagram of another optional application scenario according to an embodiment of the disclosure.

As shown in FIG. 2, a smart repeater is located between a base station and a terminal. Compared to a traditional repeater, the smart repeater has a beam management function, and a standardization goal is that the smart repeater can be transparent to the terminal. Table 1 below shows differences between smart repeaters and traditional repeaters.

TABLE 1

| | Smart repeaters | Traditional repeaters |
|---|---|---|
| Uplink and downlink of time division | according to a slot ratio of uplink and downlink, amplification can be performed for both uplink and downlink information of the slot ratio is required | uplink and downlink are amplified at the same time, which is easy to generate self-excitation |

TABLE 1-continued

| | Smart repeaters | Traditional repeaters |
|---|---|---|
| Beam management | have the beam management function, have a capability to aim beams at users for directional amplification and forwarding | omnidirectional or directional, such as receiving signals from outside a building (a glass window) and directionally sending the signals to inside of the building (the glass window) unable to perform the beam management |
| Protocol stack | on data forwarding only the radio frequency (RF) part does not parse and repackage data configurations of uplink and downlink slots and beams can be based on a protocol stack on a UE side | RF channel, direct amplification |

For frequency bands of Frequency Division Duplexing (FDD), the traditional repeater performs simultaneous power amplification for uplink and downlink. The self-excitation effect of the repeater is avoided mainly by frequency isolation. The smart repeater is mainly oriented to FR2, and FR2 is mostly FDD frequency band. In order to better configure uplink and downlink operations of the base station, the smart repeater needs to respectively perform uplink and downlink amplifications and forwarding operations according to uplink and downlink slots configured by the base station. The smart repeater needs slot information configured by the base station.

The traditional repeater of FR1 mostly employs directional beams or omni-directional beams. For example, the repeater receives a signal outside a building (outside a glass window) and directionally sends the signal to the user within the building (the glass window). In addition, the traditional repeater cannot perform a flexible beam management. In addition, for the smart repeater of the FR2, the beam management function needs to be introduced, so that a beam can be aligned to a user to perform directional amplification and forwarding operations. Meanwhile, a direction of the beam can avoid an effect of self-excitation of the repeater to a certain extent.

On a protocol stack level, the traditional repeater only has a radio frequency channel, for direct amplification and forwarding. In addition, for the smart repeater, only a radio frequency part is provided to perform amplification and forwarding of data, the data is not parsed, repackaged and forwarded. However, in order to better match the uplink and downlink of the base station and perform the beam management, a UE part of the repeater is expected to have a certain protocol stack function.

Since the smart repeater only forwards the data, the smart repeater is unclear about how many users are served. Likewise, the smart repeater does not know when the base station schedules the user because the smart repeater does not parse the PDCCH and data provided by the base station to the user.

The smart repeater cannot perform the beam management for the users served by the smart repeater. On the one hand, the smart repeater does not generate a signal and send the signal to the users. On the other hand, the smart repeater does not know how many users are served by the smart repeater, and does not know the relevant user information exactly. The smart repeater may only forward the signal of the base station or the terminal to achieve a purpose of the beam management.

Based on the above, in order to make the smart repeater better serve the users, it is first necessary to determine when the smart repeater provides services for the base station and the terminal, and how to identify the user without parsing user information. Meanwhile, it is also necessary to solve the problem that the smart repeater serves multiple users at the same time.

For a foregoing relationship between a beam and a slot, one manner is that semi-static configuration may be performed through a Radio Resource Control (RRC) signal, to indicate whether a specific slot is used for the forwarding operation of the smart repeater. However, in this case, scheduling of a user of the smart repeater is limited, and if there is a burst service, a positive response may not be caused, so a more flexible indication or scheduling manner is required. Similarly, for this relative dynamic and flexible indication manner, since the smart repeater cannot parse the downlink signal of the base station that needs to be forwarded (because the downlink signal is transparent to the smart repeater), it also needs to solve the problem of how to align the beam to which direction or which user.

Therefore, the following technical solutions of the embodiments of the disclosure are provided.

For case of understanding the technical solutions of the embodiments of the disclosure, the technical solutions of the disclosure are described in detail below through specific embodiments. The foregoing related technologies used as an optional solutions may be arbitrarily combined with the technical solutions of the embodiments of the disclosure, which all belong to the protection scope of the embodiments of the disclosure. The embodiments of the disclosure include at least some of the following content.

Figure 3:
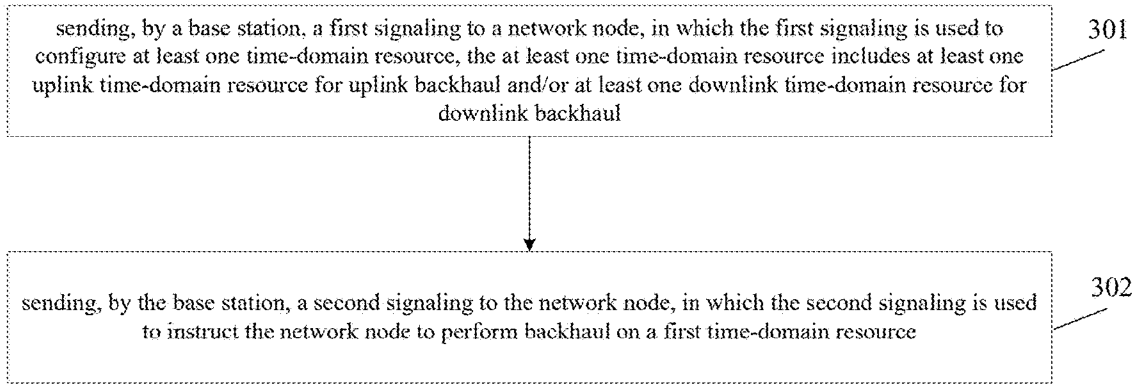
FIG. 3 is a schematic flowchart of a method for determining a time-domain resource according to an embodiment of the disclosure.

FIG. 3 is a schematic flowchart of a method for determining a time-domain resource according to an embodiment of the disclosure. As shown in FIG. 3, the method for determining a time-domain resource includes the following steps.

At step 301, a base station sends a first signaling to a network node, the network node receives the first signaling sent by the base station, the first signaling is used to configure at least one time-domain resource, and the at least one time-domain resource includes at least one uplink time-domain resource for uplink backhaul and/or at least one downlink time-domain resource for downlink backhaul.

In the embodiment of the disclosure, the network node may be a repeater, for example, may be referred to as a smart repeater. The network node may be understood as a network-controlled repeater/relay.

In the embodiment of the disclosure, the network node receives the first signaling sent by the base station. In some optional implementations, the first signaling may be RRC configuration information. The first signaling is used to configure the at least one time-domain resource, and the at least one time-domain resource includes the at least one uplink time-domain resource used for uplink backhaul and/or the at least one downlink time-domain resource used for downlink backhaul.

Herein, the time-domain resource may be one or more slots, or may be one or more symbols.

Herein, the uplink backhaul refers to that: the network node forwards (amplifies and transmits) uplink data or an uplink signal transmitted by a terminal to a previous-level node or the base station, or the network node is in an uplink forwarding state. In the case that the network node is in the uplink forwarding state, the network node may not actually transmit the uplink data or the uplink signal.

Herein, the downlink backhaul refers to that: the network node forwards (amplifies and transmits) downlink data or a downlink signal of the base station or the previous-level node to a next-level node or the terminal, or the network node is in a downlink forwarding state. In a case that the network node is in the downlink forwarding state, the network node may not actually transmit the downlink data or the downlink signal.

In some optional implementations, the at least one time-domain resource is periodically configured in the time-domain.

In some optional implementations, the first signaling is further used to configure at least one of the following:

- spatial information respectively corresponding to the at least one uplink time-domain resource;
- spatial information respectively corresponding to the at least one downlink time-domain resource; or
- an association relationship between the at least one uplink time-domain resource and the at least one downlink time-domain resource, an uplink time-domain resource and a downlink time-domain resource having the association relationship correspond to same or associated spatial information.

The spatial information is a beam direction, a beam state, a transmission configuration, a transmission configuration indication, or spatial-domain filtering information. The spatial information may also be a beam or beam-related indication, a spatial relation, or a spatial-domain (send or receive) filter.

In some optional implementations, the network node reports a first transmission configuration to the base station, and the base station receives the first transmission configuration reported by the network node. The first transmission configuration is used to configure a number of beams or a number of spatial-domain filtering configurations of a distribute unit (DU) or a radio frequency unit; or the first transmission configuration is used to configure a number of beams for the network node to perform downlink beam scanning; or the first transmission configuration is used to configure a number of beams or a number of spatial-domain filtering configurations for serving users by the network node; or the first transmission configuration is used to configure a number of spatial-domain filtering configurations for downlink transmission or uplink transmission by the network node.

In some optional implementations, the first transmission configuration is used for the base station to determine the at least one uplink time-domain resource for uplink backhaul and/or the at least one downlink time-domain resource for downlink backhaul.

As an example, the base station configures slots 1, 2, 3, 4, 5, 6 for backhaul through RRC. The slots 1, 2, and 3 are downlink slots, and are used for the downlink backhaul. The slots 4, 5, and 6 are uplink slots, and are used for the uplink backhaul. The slot 1 and the slot 4 use a same beam of the network node, i.e., there is a correspondence (or an association relationship) between the slot 1 and the slot 4. Optionally, a slot that may be used for backhaul configured by the RRC adopts a periodic configuration manner.

At step 302, the base station sends a second signaling to the network node, the network node receives the second signaling sent by the base station, and the second signaling is used to instruct the network node to perform backhaul on a first time-domain resource.

In the embodiment of the disclosure, the network node receives the second signaling sent by the base station. In some optional implementations, the second signaling is Downlink Control Information (DCI) or is carried by a Media Access Control Control Element (MAC CE). The second signaling is used to instruct the network node to perform the backhaul on the first time-domain resource.

In some optional implementations, a reference point or a calculation starting point of the first time-domain resource is a time-domain resource where the second signaling is located, or a time-domain resource obtained by adding an offset to the time-domain resource where the second signaling is located.

In an implementation, the second signaling carries first information, the first information is used to indicate that a duration of an offset between the first time-domain resource and the time-domain resource where the second signaling is located is M time-domain resources, where M is an integer greater than or equal to 0. Herein, the duration is less than or equal to a period of the multiple time-domain resources.

Herein, optionally, the duration is greater than or equal to at least one or a sum of more than one of: a processing time of the second signaling, a beam adjustment time, and a time for the network node to switch a working state.

Herein, it should be noted that the beam adjustment time may be a time indicated by a parameter time DurationForQCL or an adjustment time of a transmission configuration.

In some optional implementations, the second signaling carries second information, the second information is used to indicate an uplink resource, and the uplink resource is used by the network node to transmit hybrid automatic repeat request-acknowledgement (HARQ-ACK) information; and the method further includes:

- transmitting, by the network node, the HARQ-ACK information on the uplink resource indicated by the second information; or,
- transmitting, by the network node, the HARQ-ACK information on a latest time-domain resource for the uplink backhaul after receiving the second signaling.

Herein, the HARQ-ACK information is used to indicate whether the second information is correctly received or detected.

Specifically, if the network node correctly receives or detects the second signaling, the HARQ-ACK information is set as an ACK value; or if the network node does not correctly receive or detect the second signaling, the HARQ-ACK information is set as an NACK value.

In some optional implementations, the second signaling carries third information, and the third information is used to indicate spatial information and/or an uplink/downlink transmission direction corresponding to the first time-domain resource. The spatial information is a beam direction, a beam state, a transmission configuration, a transmission configuration indication, or spatial-domain filtering information. A specific implementation of the third information is described below.

Implementation 1), in some optional implementations, the third information is used to indicate a second time-domain resource of multiple time-domain resources. The spatial information corresponding to the first time-domain resource is the same as spatial information corresponding to the second time-domain resource, and the uplink/downlink transmission direction corresponding to the first time-domain resource is the same as an uplink/downlink transmission direction corresponding to the second time-domain resource.

Implementation 2), in some optional implementations, the third information is used to indicate first spatial information among multiple pieces of spatial information supported by the network node. The spatial information corresponding to the first time-domain resource is the first spatial information. Further, option 1), the uplink/downlink transmission direction corresponding to the first time-domain resource is determined based on a resource type configured for the first time-domain resource. The resource type indicates an uplink time-domain resource or a downlink time-domain resource. Option 2), the third information is further used to indicate the uplink/downlink transmission direction corresponding to the first time-domain resource, and the uplink/downlink transmission direction corresponding to the first time-domain resource is determined based on the third information.

In the embodiment of the disclosure, the first time-domain resource indicated by the second signaling may be a downlink time-domain resource, or may be an uplink time-domain resource, and the solutions of the embodiments of the disclosure are described below with reference to two cases.

Case 1), the first time-domain resource is a downlink time-domain resource, the second signaling indicates the second time-domain resource or first spatial information associated with the first time-domain resource through the third information, in which,

- an uplink time-domain resource associated with the first time-domain resource is an uplink time-domain resource corresponding to the second time-domain resource or the first spatial information; or,
- an uplink time-domain resource associated with the first time-domain resource is a next uplink time-domain resource of the first time-domain resource;
- the first time-domain resource and the uplink time-domain resource associated with the first time-domain resource have same or associated spatial information.

Case 2), the first time-domain resource is an uplink time-domain resource, and the second signaling indicates the second time-domain resource or first spatial information associated with the first time-domain resource through the third information, in which,

- a downlink time-domain resource associated with the first time-domain resource is a downlink time-domain resource corresponding to the second time-domain resource or the first spatial information; or,
- a downlink time-domain resource associated with the first time-domain resource is a next downlink time-domain resource of the first time-domain resource;
- the first time-domain resource and the downlink time-domain resource associated with the first time-domain resource have same or associated spatial information.

Further, in some optional implementations, the second signaling is further used to instruct the network node to perform backhaul on a third time-domain resource. Herein, optionally, the first time-domain resource is a downlink time-domain resource, and the third time-domain resource is an uplink time-domain resource; or the first time-domain resource is an uplink time-domain resource, and the third time-domain resource is a downlink time-domain resource.

Solution A), the second signaling indicates the second time-domain resource through the third information. Spatial information of the first time-domain resource and spatial information of the third time-domain resource are the same as spatial information of the second time-domain resource.

Solution B), the second signaling indicates the first spatial information through the third information. The spatial information of the first time-domain resource and the spatial information of the third time-domain resource are the same as the first spatial information.

Solution C), the second signaling indicates the second time-domain resource associated with the first time-domain resource, and indicates a fourth time-domain resource associated with the third time-domain resource, through the third information, in which,

- the spatial information of the first time-domain resource is the same as spatial information of the second time-domain resource, and spatial information of the third time-domain resource is the same as spatial information of the fourth time-domain resource.

Solution D), the second signaling indicates the first spatial information associated with the first time-domain resource and indicates second spatial information associated with the third time-domain resource through the third information. The spatial information of the first time-domain resource is the same as the first spatial information, and the spatial information of the third time-domain resource is the same as the second spatial information.

In the embodiment of the disclosure, the spatial information corresponding to the first time-domain resource determined based on the second signaling overwrites the spatial information corresponding to the first time-domain resource determined based on the first signaling.

It should be noted that the overwriting refers to: the time-domain resource currently indicated based on the second signaling adopts the spatial information indicated by the third information, and other resources that are not illustrated by the second signaling still adopts the spatial information corresponding to the first time-domain resource determined based on the first signaling.

As an example, the base station dynamically instructs the network node to perform the backhaul in a certain slot (referred to as slot X) through the DCI. A reference point of the slot X is a slot where the DCI is located, and X indicates an X-th slot after the slot where the DCI is located. X needs to be greater than or equal to at least one or a sum of more than one of the following: a processing time of the DCI, a beam adjustment time, and a time for the network node to switch a working state. Herein, the beam adjustment time may be a time indicated by the parameter timeDurationForQCL. The time for the network node to switch the working state refers to a time required for the network node to switch from a non-forwarding state to a forwarding state (such as a switching time of PA or a conversion time of uplink and downlink). X needs to be less than a period of slots used for the backhaul configured through RRC configuration information. In an optional manner, if a slot indicated by the DCI is an uplink slot, it indicates that the backhaul of the slot is the uplink backhaul; and if the slot indicated by the DCI is the downlink slot, it indicates that the backhaul of the slot is the downlink backhaul. In another optional manner, if the DCI further indicates uplink or downlink, whether the backhaul of the slot indicated by the DCI is the uplink backhaul or the downlink backhaul may be determined according to the uplink or downlink indicated in the DCI. The uplink or downlink indicated in the DCI may be different from an uplink and downlink transmission configuration configured by the base station. The network node may feed back the HARQ-ACK information on the uplink resource indicated by the DCI, for example, the network node feeds back an ACK, indicating that the network node correctly receives the DCI. Alternatively, the network node may feed back the HARQ-ACK information in a time for forwarding latest uplink data of the user, for example, the network node feeds back an ACK, indicating that the network node correctly receives the DCI.

As an example, the base station determines a beam or slot information of the network node associated with the terminal according to Identity (ID) information of Channel State Information Reference Symbol (CSI-RS) fed back by early CSI-RS Reference Signal Receive Power (RSRP) of the terminal, or may determine the beam or slot information of the network node associated with the terminal based on a measurement of an SSB and time information of uplink PRACH transmission (for example, an RACH occasion). Option 1), the base station directly indicates a certain slot in 6 slots (configured by the RRC), for example, 3-bit information is used to indicate a certain slot therein, which indicates that a beam used by the slot X indicated by the DCI has a same spatial relationship (a spatial state or a TCI state) as a slot indicated in the 3-bit information, or the two slots use a same beam. If the slot indicated by the 3-bit information is an uplink slot, the slot X indicated by the DCI is a slot for the uplink backhaul; and if the slot indicated by the 3-bit information is a downlink slot, the slot X indicated by the DCI is a slot for the downlink backhaul. For example, when the 3-bit information indicates the slot 1 (the slot 1 is a downlink slot), it indicates that the backhaul of the slot X and the slot 1 have a same beam direction or transmission state (for example, the same transmission configuration or transmission configuration indication), and the uplink/downlink transmission direction of the slot X is also the same as the slot 1. Option 2), the base station configures uplink and downlink beam states corresponding to the network node through the RRC, for example, a beam state 1, a beam state 2, a beam state 3, and beam states 1, 2, and 3 respectively represent different beam directions or beams of the network node. These beams may be used for sending in different downlink directions or receiving in different uplink directions. Further, the DCI further needs to indicate whether the backhaul of the slot X is the uplink backhaul or the downlink backhaul. Option 3), the base station configures the uplink and downlink beam states corresponding to the network node through the DCI, for example, the beam states 1, 2, and 3. The DCI indicates the beam state configured by the RRC, and the indicated beam state is used for the network node to perform the backhaul. The network node determines whether a corresponding backhaul is the uplink backhaul or the downlink backhaul based on the uplink and downlink of a slot where the slot X indicated by the DCI is located.

For example, if the slot X is a downlink slot, and the slot 1 or the beam state 1 (one beam state may correspond to a pair of uplink and downlink slots) is associated, a corresponding uplink may be an uplink slot corresponding to the slot 1 or the beam state 1 (or a next uplink slot or a nearest next uplink slot). If the DCI indicates two slots at the same time, for example, one is the downlink slot X, one is the uplink slot Y, option 1), if the slot X is associated with the slot 1 configured by the RRC, the slot Y uses the same beam or spatial state as the slot 1. Option 2), If the slot X is associated with the slot 1 configured by the RRC, the slot Y is associated with a slot 2 (a downlink slot) or a slot 5 (an uplink slot) configured by the RRC, and beam directions or spatial states of the slot 2 and the slot 5 are different from that of the slot 1. Option 3), if the DCI simultaneously indicates the slot X and the slot Y, but only indicates one piece of beam state information, it indicates that the slot X is the downlink slot of the beam state, and the slot Y is the uplink slot of the beam state. It should be noted that, for the beam direction and/or the uplink/downlink transmission direction, the slot indicated by the DCI may overwrite or override an original slot configured by the RRC. The objective is to update beam directions configured for some slots or perform some transmissions in advance according to a demand of a service priority.

The following describes the technical solutions of the embodiments of the disclosure with reference to specific application examples.

Figure 4:
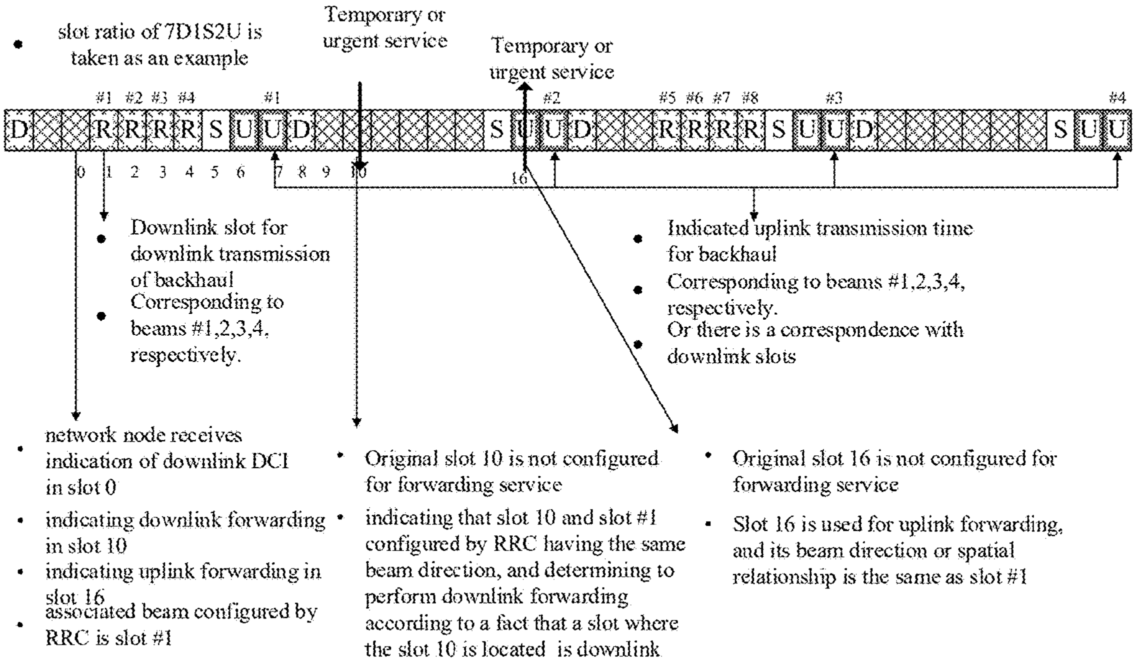
FIG. 4 is a schematic diagram related to an application example according to an embodiment of the disclosure.

As shown in FIG. 4, a base station configures slots 1, 2, 3, and 4 for downlink backhaul through RRC, and there are uplink slots 1, 2, 3, and 4 for uplink backhaul corresponding to the downlink slots 1, 2, 3, and 4. The downlink slot 1 and the uplink slot 1 have a same beam direction, transmission configuration or transmission configuration indication. The base station indicates to a network node, through DCI (located in slot 0), that slots 10 and 16 are associated with the slot #1 configured by the RRC. There is no backhaul to be performed on the slot 10 originally, a backhaul is performed on the slot 10 according to the instruction of the DCI. The slot 10 indicated by the DCI has the same beam direction as the slot #1 configured by the RRC, so that the beam direction of the slot 10 is the same as the slot #1 previously configured by the RRC. The network node performs the uplink backhaul on the slot 16. An uplink beam receiving direction is the same as a beam direction used in the slot #1 or is the same as a beam direction of the uplink slot #1 corresponding to the slot #1.

According to the technical solutions of the embodiments of the disclosure, the problem that how the network node performs a downlink beam management and determines the number of users served by the network node under a condition that the network node cannot parse control information provided by the base station to the terminal is solved. In a case that a reference signal sent by the base station is transparent to the network node, the base station dynamically indicates the uplink and downlink slots and corresponding beam directions to the network node. The base station schedules the network node, through the dynamic indication, to perform the uplink backhaul or the downlink backhaul on a slot where the beam forwarding is not performed originally. The beam direction is indicated through indicating an associated slot or a beam state configured by the RRC, so that the network node can perform the backhaul in a required direction.

Figure 5:
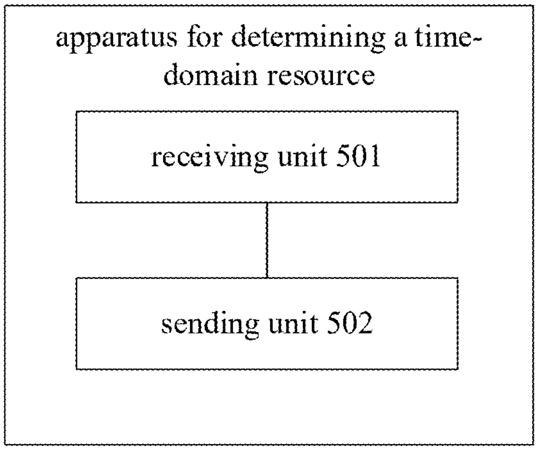
FIG. 5 is a first schematic block diagram of an apparatus for determining a time-domain resource according to an embodiment of the disclosure.

FIG. 5 is a first schematic block diagram of an apparatus for determining a time-domain resource according to an embodiment of the disclosure. The apparatus is applied to a network node (for example, a smart repeater). As shown in FIG. 5, the apparatus for determining a time-domain resource includes:

- a receiving unit 501, configured to receive a first signaling sent by a base station, in which the first signaling is used to configure at least one time-domain resource, the at least one time-domain resource includes at least one uplink time-domain resource for uplink backhaul and/or at least one downlink time-domain resource for downlink backhaul; and receive a second signaling sent by the base station, in which the second signaling is used to instruct the network node to perform backhaul on a first time-domain resource.

In some optional implementations, the first signaling is further used to configure at least one of the following:

- spatial information respectively corresponding to the at least one uplink time-domain resource;
- spatial information respectively corresponding to the at least one downlink time-domain resource; or
- an association relationship between the at least one uplink time-domain resource and the at least one downlink time-domain resource, in which an uplink time-domain resource and a downlink time-domain resource having the association relationship correspond to same or associated spatial information;

The spatial information is a beam direction, a beam state, a transmission configuration, a transmission configuration indication, or spatial-domain filtering information.

In some optional implementations, the apparatus further includes: a sending unit 502, configured to report a first transmission configuration to the base station.

The first transmission configuration is used to configure a number of beams or a number of spatial-domain filtering configurations of a DU or a radio frequency unit; or,

- the first transmission configuration is used to configure a number of beams for downlink beam scanning by the network node; or,
- the first transmission configuration is used to configure a number of beams or a number of spatial-domain filtering configurations for serving users by the network node; or,
- the first transmission configuration is used to configure a number of spatial-domain filtering configurations for downlink transmission or uplink transmission by the network node.

In some optional implementations, the first transmission configuration is used for the base station to determine the at least one uplink time-domain resource for the uplink backhaul and/or the at least one downlink time-domain resource for the downlink backhaul.

In some optional implementations, the at least one time-domain resource is periodically configured in a time-domain.

In some optional implementations, a reference point or a calculation starting point of the first time-domain resource is a time-domain resource where the second signaling is located, or a time-domain resource obtained by adding an offset to the time-domain resource where the second signaling is located.

In some optional implementations, the second signaling carries first information, the first information is used to indicate that a duration of an offset between the first time-domain resource and the time-domain resource where the second signaling is located is M time-domain resources, where M is an integer greater than or equal to 0.

In some optional implementations, the duration is greater than or equal to at least one or a sum of more than one of: a processing time of the second signaling, a beam adjustment time, and a time for the network node to switch a working state.

In some optional implementations, the duration is less than or equal to a period of a plurality of time-domain resources.

In some optional implementations, the second signaling carries second information, and the second information is used to indicate an uplink resource; the sending unit 502 is configured to transmit HARQ-ACK information on the uplink resource indicated by the second information; or transmit HARQ-ACK information on a latest time-domain resource for the uplink backhaul after receiving the second signaling.

In some optional implementations, the second signaling carries third information, and the third information is used to indicate spatial information and/or an uplink/downlink transmission direction corresponding to the first time-domain resource. The spatial information is a beam direction, a beam state, a transmission configuration, a transmission configuration indication, or spatial-domain filtering information.

In some optional implementations, the third information is used to indicate a second time-domain resource among the plurality of time-domain resources. Spatial information corresponding to the first time-domain resource is the same as spatial information corresponding to the second time-domain resource, and the uplink/downlink transmission direction corresponding to the first time-domain resource is the same as an uplink/downlink transmission direction corresponding to the second time-domain resource.

In some optional implementations, the third information is used to indicate first spatial information among a plurality of pieces of spatial information supported by the network node. The spatial information corresponding to the first time-domain resource is the first spatial information.

In some optional implementations, the uplink/downlink transmission direction corresponding to the first time-domain resource is determined based on a resource type configured for the first time-domain resource. The resource type indicates an uplink time-domain resource or a downlink time-domain resource.

In some optional implementations, the third information is further used to indicate the uplink/downlink transmission direction corresponding to the first time-domain resource. The uplink/downlink transmission direction corresponding to the first time-domain resource is determined based on the third information.

In some optional implementations, the first time-domain resource is a downlink time-domain resource, the second signaling indicates a second time-domain resource or first spatial information associated with the first time-domain resource through the third information, in which,

- an uplink time-domain resource associated with the first time-domain resource is an uplink time-domain resource corresponding to the second time-domain resource or the first spatial information; or,
- an uplink time-domain resource associated with the first time-domain resource is a next uplink time-domain resource of the first time-domain resource;
- the first time-domain resource and the uplink time-domain resource associated with the first time-domain resource have same or associated spatial information.

In some optional implementations, the first time-domain resource is an uplink time-domain resource, and the second signaling indicates a second time-domain resource or first spatial information associated with the first time-domain resource through the third information, in which a downlink time-domain resource associated with the first time-domain resource is a downlink time-domain resource corresponding to the second time-domain resource or the first spatial information; or, a downlink time-domain resource associated with the first time-domain resource is a next downlink time-domain resource of the first time-domain resource;

the first time-domain resource and the downlink time-domain resource associated with the first time-domain resource have same or associated spatial information.

In some optional implementations, the second signaling is further used to instruct the network node to perform backhaul on a third time-domain resource.

In some optional implementations, the second signaling indicates a second time-domain resource or first spatial information through third information.

Spatial information of the first time-domain resource and spatial information of the third time-domain resource are the same as spatial information of the second time-domain resource or the first spatial information.

In some optional implementations, the second signaling indicates a second time-domain resource or the first spatial information associated with the first time-domain resource and indicates a fourth time-domain resource or second spatial information associated with the third time-domain resource, through the third information.

Spatial information of the first time-domain resource is the same as spatial information of the second time-domain resource or the first spatial information, and spatial information of the third time-domain resource is the same as spatial information of the fourth time-domain resource or the second spatial information.

In some optional implementations, the first time-domain resource is a downlink time-domain resource, and the third time-domain resource is an uplink time-domain resource; or the first time-domain resource is an uplink time-domain resource, and the third time-domain resource is a downlink time-domain resource.

In some optional implementations, the spatial information corresponding to the first time-domain resource determined based on the second signaling overwrites the spatial information corresponding to the first time-domain resource determined based on the first signaling.

In some optional implementations, the first signaling is RRC configuration information.

In some optional implementations, the second signaling is DCI or is carried by an MAC CE.

Those skilled in the art should understand that an implementation function of each unit in the apparatus for determining a time-domain resource shown in FIG. 5 may be understood with reference to related descriptions of the foregoing method. The functions of the units in the apparatus for determining a time-domain resource shown in FIG. 5 may be implemented by a program running on a processor or may be implemented by using a specific logic circuit.

Figure 6:
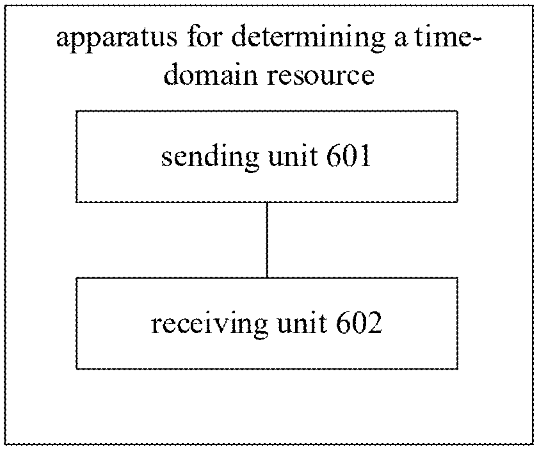
FIG. 6 is a second schematic block diagram of an apparatus for determining a time-domain resource according to an embodiment of the disclosure.

FIG. 6 is a second schematic block diagram of an apparatus for determining a time-domain resource according to an embodiment of the disclosure. The apparatus is applied to a base station. As shown in FIG. 6, the apparatus for determining a time-domain resource includes:

a sending unit 601, configured to send a first signaling to a network node, in which the first signaling is used to configure at least one time-domain resource, the at least one time-domain resource includes at least one uplink time-domain resource for uplink backhaul and/or at least one downlink time-domain resource for downlink backhaul; and send a second signaling to the network node, in which the second signaling is used to instruct the network node to perform backhaul on a first time-domain resource.

In some optional implementations, the first signaling is further used to configure at least one of the following:

spatial information respectively corresponding to the at least one uplink time-domain resource;

spatial information respectively corresponding to the at least one downlink time-domain resource; or an association relationship between the at least one uplink time-domain resource and the at least one downlink time-domain resource, in which an uplink time-domain resource and a downlink time-domain resource having the association relationship correspond to same or associated spatial information;

in which the spatial information is a beam direction, a beam state, a transmission configuration, a transmission configuration indication, or spatial-domain filtering information.

In some optional implementations, the apparatus further includes a receiving unit 602, configured to receive a first transmission configuration reported by the network node.

The first transmission configuration is used to configure a number of beams or a number of spatial-domain filtering configurations of a DU or a radio frequency unit; or, the first transmission configuration is used to configure a number of beams for downlink beam scanning by the network node; or, the first transmission configuration is used to configure a number of beams or a number of spatial-domain filtering configurations for serving users by the network node; or, the first transmission configuration is used to configure a number of spatial-domain filtering configurations for downlink transmission or uplink transmission by the network node.

In some optional implementations, the first transmission configuration is used for the base station to determine the at least one uplink time-domain resource for the uplink backhaul and/or the at least one downlink time-domain resource for the downlink backhaul.

In some optional implementations, the at least one time-domain resource is periodically configured in time-domain.

In some optional implementations, a reference point or a calculation starting point of the first time-domain resource is a time-domain resource where the second signaling is located, or a time-domain resource obtained by adding an offset to the time-domain resource where the second signaling is located.

In some optional implementations, the second signaling carries first information, the first information is used to indicate that a duration of an offset between the first time-domain resource and the time-domain resource where the second signaling is located is M time-domain resources, where M is an integer greater than or equal to 0.

In some optional implementations, the duration is greater than or equal to at least one or a sum of more than one of: a processing time of the second signaling, a beam adjustment time, and a time for the network node to switch a working state.

In some optional implementations, the duration is less than or equal to a period of the multiple time-domain resources.

In some optional implementations, the second signaling carries second information, the second information is used to indicate an uplink resource, and the uplink resource is used for the network node to transmit HARQ-ACK information.

In some optional implementations, the second signaling carries third information, and the third information is used to indicate spatial information and/or uplink/downlink transmission direction corresponding to the first time-domain resource. The spatial information is a beam direction, a beam state, a transmission configuration, a transmission configuration indication, or spatial-domain filtering information.

In some optional implementations, the third information is used to indicate a second time-domain resource among the multiple time-domain resources. Spatial information corresponding to the first time-domain resource is the same as spatial information corresponding to the second time-domain resource, and the uplink/downlink transmission direction corresponding to the first time-domain resource is the same as an uplink/downlink transmission direction corresponding to the second time-domain resource.

In some optional implementations, the third information is used to indicate first spatial information among multiple pieces of spatial information supported by the network node. The spatial information corresponding to the first time-domain resource is the first spatial information.

In some optional implementations, the uplink/downlink transmission direction corresponding to the first time-domain resource is determined based on a resource type configured for the first time-domain resource. The resource type indicates an uplink time-domain resource or a downlink time-domain resource.

In some optional implementations, the third information is further used to indicate the uplink/downlink transmission direction corresponding to the first time-domain resource. The uplink/downlink transmission direction corresponding to the first time-domain resource is determined based on the third information.

In some optional implementations, the first time-domain resource is a downlink time-domain resource, the second signaling indicates a second time-domain resource or first spatial information associated with the first time-domain resource through the third information, in which,

- an uplink time-domain resource associated with the first time-domain resource is an uplink time-domain resource corresponding to the second time-domain resource or the first spatial information; or,
- an uplink time-domain resource associated with the first time-domain resource is a next uplink time-domain resource of the first time-domain resource;
- in which the first time-domain resource and the uplink time-domain resource associated with the first time-domain resource have same or associated spatial information.

In some optional implementations, the first time-domain resource is an uplink time-domain resource, and the second signaling indicates a second time-domain resource or first spatial information associated with the first time-domain resource through the third information.

- a downlink time-domain resource associated with the first time-domain resource is a downlink time-domain resource corresponding to the second time-domain resource or the first spatial information; or,
- a downlink time-domain resource associated with the first time-domain resource is a next downlink time-domain resource of the first time-domain resource;
- in which the first time-domain resource and the downlink time-domain resource associated with the first time-domain resource have same or associated spatial information.

In some optional implementations, the second signaling is further used to instruct the network node to perform the backhaul on the third time-domain resource.

In some optional implementations, the second signaling indicates a second time-domain resource or first spatial information through the third information.

Spatial information of the first time-domain resource and spatial information of the third time-domain resource are the same as spatial information of the second time-domain resource or the first spatial information.

In some optional implementations, the second signaling indicates a second time-domain resource or first spatial information associated with the first time-domain resource and indicates a fourth time-domain resource or second spatial information associated with the third time-domain resource, through the third information.

Spatial information of the first time-domain resource is the same as spatial information of the second time-domain resource or the first spatial information, and spatial information of the third time-domain resource is the same as spatial information of the fourth time-domain resource or the second spatial information.

In some optional implementations, the first time-domain resource is a downlink time-domain resource, and the third time-domain resource is an uplink time-domain resource; or the first time-domain resource is an uplink time-domain resource, and the third time-domain resource is a downlink time-domain resource.

In some optional implementations, the spatial information corresponding to the first time-domain resource determined based on the second signaling overwrites the spatial information corresponding to the first time-domain resource determined based on the first signaling.

In some optional implementations, the first signaling is RRC configuration information.

In some optional implementations, the second signaling is DCI or is carried by an MAC CE.

Those skilled in the art should understand that an implementation function of each unit in the apparatus for determining a time-domain resource shown in FIG. 6 may be understood with reference to related descriptions of the foregoing method. The functions of the units in the apparatus for determining a time-domain resource shown in FIG. 6 may be implemented by a program running on a processor or may be implemented by using a specific logic circuit.

Figure 7:
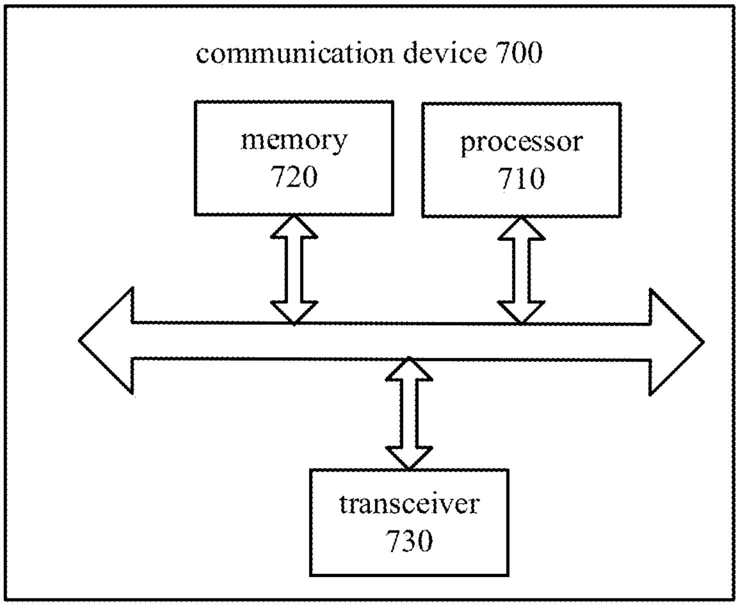
FIG. 7 is a schematic block diagram of a communication device according to an embodiment of the disclosure.

FIG. 7 is a block diagram of a communication device 700 according to an embodiment of the disclosure. The communication device may be a network node (for example, a smart repeater) or a base station, the communication device 700 shown in FIG. 7 includes a processor 710, and the processor 710 may call and run a computer program from a memory to implement the method in the embodiments of the disclosure.

Optionally, as shown in FIG. 7, the communication device 700 may further include a memory 720. The processor 710 may call and run a computer program from the memory 720 to implement the method in the embodiments of the disclosure.

The memory 720 may be a separate device independent of the processor 710 or may be integrated into the processor 710.

Optionally, as shown in FIG. 7, the communication device 700 may further include a transceiver 730, and the processor

710 may control the transceiver 730 to communicate with another device. Specifically, the transceiver 730 may send information or data to another device, or receive information or data sent by another device.

The transceiver 730 may include a transmitter and a receiver. The transceiver 730 may further include an antenna, and the number of the antennas may be one or more.

Optionally, the communication device 700 may be specifically a network node (for example, a smart repeater) in the embodiments of the disclosure. The communication device 700 may implement a corresponding procedure implemented by the network node (for example, a smart repeater) in each method of the embodiments of the disclosure. For brevity, details are not described herein again.

Optionally, the communication device 700 may be specifically a base station in the embodiments of the disclosure. The communication device 700 may implement a corresponding procedure implemented by the base station in each method of the embodiments of the disclosure. For brevity, details are not described herein again.

Figure 8:
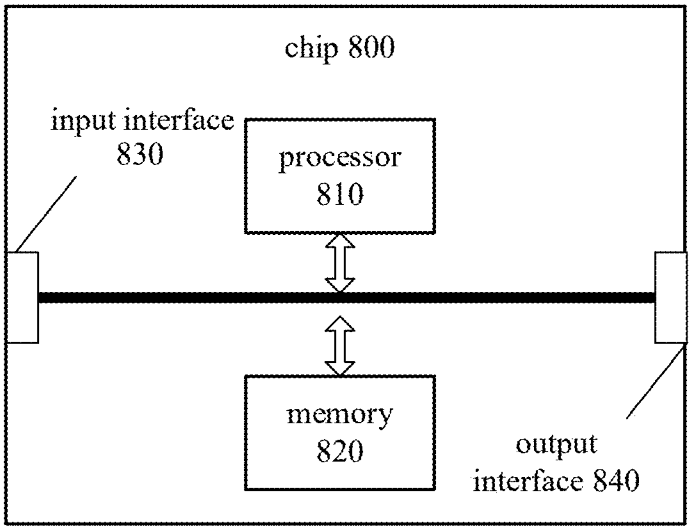
FIG. 8 is a schematic block diagram of a chip according to an embodiment of the disclosure.

FIG. 8 is a block diagram of a chip according to an embodiment of the disclosure. A chip 800 shown in FIG. 8 includes a processor 810, and the processor 810 may call and run a computer program from a memory to implement the method in the embodiments of the disclosure.

Optionally, as shown in FIG. 8, the chip 800 may further include a memory 820. The processor 810 may call and run a computer program from the memory 820 to implement the method in the embodiments of the disclosure.

The memory 820 may be a separate device independent of the processor 810 or may be integrated into the processor 810.

Optionally, the chip 800 may further include an input interface 830. The processor 810 may control the input interface 830 to communicate with another device or a chip. Specifically, the processor 810 may obtain information or data sent by another device or a chip.

Optionally, the chip 800 may further include an output interface 840. The processor 810 may control the output interface 840 to communicate with another device or chip, and specifically, may output information or data to another device or chip.

Optionally, the chip may be applied to a network node (for example, a smart repeater) in the embodiments of the disclosure. The chip may implement a corresponding procedure implemented by a network node (for example, a smart repeater) in each method of the embodiments of the disclosure. For brevity, details are not described herein again.

Optionally, the chip may be applied to a base station in the embodiments of the disclosure. The chip may implement a corresponding procedure implemented by the base station in each method of the embodiments of the disclosure. For brevity, details are not described herein again.

It should be understood that the chip mentioned in the embodiment of the disclosure may also be referred to as a system-level chip, a system chip, a chip system, an on-chip system chip, and the like.

It should be understood that the processor in the embodiment of the disclosure may be an integrated circuit chip and have a signal processing capability. In an implementation process, steps in the foregoing method embodiments may be completed by using an integrated logic circuit of hardware in the processor or instructions in a form of software. The processor may be a general-purpose processor, a Digital Signal Processor (DSP), an Application Specific Integrated Circuit (ASIC), a Field Programmable Gate Array (FPGA), another programmable logic device, a discrete gate or transistor logic device, or a discrete hardware component. The processor may implement or perform the methods, steps, and logical block diagrams disclosed in the embodiments of the disclosure. The general-purpose processor may be a microprocessor, or the processor may be any conventional processor or the like. The steps of the methods disclosed with reference to the embodiments of the disclosure may be directly performed and completed by a hardware decoding processor or may be performed and completed by using a combination of hardware and a software module in a decoding processor. The software module may be located in a mature storage medium in the art, such as a Random Access Memory (RAM), a flash memory, a Read-Only Memory (ROM), a Programmable ROM (PROM), an Electrically EPROM (EEPROM), a register, and the like. The storage medium is located in the memory, and the processor reads information in the memory and completes the steps in the foregoing methods in combination with hardware of the processor.

It may be understood that the memory in the embodiment of the disclosure may be a volatile memory or a non-volatile memory or may include both a volatile memory and a non-volatile memory. The non-volatile memory may be an ROM, a Programmable ROM (PROM), an Erasable PROM (EPROM), an EEPROM, or a flash memory. The volatile memory may be an RAM, which is used as an external cache. By way of example and not limitation, many forms of RAM are available, such as Static RAM (SRAM), Dynamic RAM (DRAM), Synchronous RAM (SDRAM), Double Data Rate SDRAM (DDR SDRAM), Enhanced SDRAM (ESDRAM), Synchronous Link DRAM (SLDRAM), and Direct Rambus RAM (DR RAM). It should be noted that the memory implementing the systems and methods described herein is intended to include, but is not limited to, these and any other suitable types of memories.

It should be understood that the memory is example and not limitation, for example, the memory in the embodiments of the disclosure may also be an SRAM, a DRAM), an SDRAM), a DDR SDRAM, an ESDRAM, an SLDRAM, a DR RAM, and the like. That is, the memory in the embodiments of the disclosure is intended to include, but is not limited to, these and any other suitable types of memories.

An embodiment of the disclosure further provides a computer-readable storage medium, configured to store a computer program.

Optionally, the computer-readable storage medium may be applied to a network node (for example, a smart repeater) in the embodiments of the disclosure, and the computer program causes a computer to perform a corresponding procedure implemented by the network node (for example, a smart repeater) in the methods of the embodiments of the disclosure. For brevity, details are not described herein again.

Optionally, the computer-readable storage medium may be applied to a base station in the embodiments of the disclosure, and the computer program causes the computer to perform a corresponding procedure implemented by the base station in the methods of the embodiments of the disclosure. For brevity, details are not described herein again.

An embodiment of the disclosure further provides a computer program product including computer program instructions.

Optionally, the computer program product may be applied to a network node (for example, a smart repeater) in the embodiments of the disclosure, and the computer program instructions cause a computer to perform a corresponding procedure implemented by the network node (for example, a smart repeater) in the methods of the embodiments of the disclosure. For brevity, details are not described herein again.

Optionally, the computer program product may be applied to a base station in the embodiments of the disclosure, and the computer program instructions cause a computer to perform a corresponding procedure implemented by the base station in the methods of the embodiments of the disclosure. For brevity, details are not described herein again.

An embodiment of the disclosure further provides a computer program.

Optionally, the computer program may be applied to a network node (for example, a smart repeater) in the embodiments of the disclosure, and when the computer program runs on a computer, the computer is caused to perform a corresponding procedure implemented by the network node (for example, a smart repeater) in the methods of the embodiments of the disclosure. For brevity, details are not described herein again.

Optionally, the computer program may be applied to a base station in the embodiments of the disclosure, and when the computer program runs on a computer, the computer is caused to perform a corresponding procedure implemented by the base station in the methods of the embodiments of the disclosure. For brevity, details are not described herein again.

A person of ordinary skill in the art may be aware that units and algorithm steps of the examples described in connection with the embodiments disclosed herein can be implemented by an electronic hardware, or a combination of computer software and an electronic hardware. Whether the functions are performed by hardware or software depends on specific applications and design constraint conditions of the technical solutions. Those skilled in the art may use different methods to implement the described functions for each specific application, but it should not be considered that the implementation goes beyond the scope of the present disclosure.

Those skilled in the art may clearly understand that, for the convenience and brevity of description, the described system, apparatus, and specific working process of the unit may refer to a corresponding process in the above method embodiments, and details are not described herein again.

In several embodiments provided by the present disclosure, it should be understood that the disclosed system, apparatus and method may be implemented in other ways. For example, the above apparatus embodiments are merely illustrative, such as division of units, only a logical function division. There may be additional division modes when actual implementation, such as a plurality of units or components may be combined or may be integrated into another system, or some features may be omitted, or not performed. The coupling or direct coupling or communication connection of each other shown or discussed may be an indirect coupling or communication connection through some interfaces, devices, or units, which may be in electrical, mechanical, or other forms.

The above units described as separate parts may or may not be physically separated, the parts shown as units may or may not be physical units, which may be located in one place, or may be distributed to a plurality of network units. Some or all units may be selected according to the actual requirements to achieve the purpose of the present disclosure.

In addition, functional units in embodiments of the present disclosure may be integrated in a processing unit, or may be physically existed separately, or two or more units may be integrated in one unit.

The above functions may be stored in a computer readable memory if it is implemented in the form of a software function unit and sold and used as an independent product, which may be stored in a computer readable storage medium. On the basis of such an understanding, the technical solution of the present disclosure essentially or partly contributing to the prior art, or part of the technical solution may be embodied in the form of a software product, is configured stored in a storage medium, including several instructions configured to operate a computer device (which may be a personal computer, a server or a network device, etc.) to perform all or part of the blocks of various embodiments of the disclosure. The forgoing medium includes a USB disk, a mobile hard disk, a Read-Only Memory (ROM), a Random Access Memory (RAM), a magnetic disk or an optical disk, and other media that may store program codes.

The above is merely a specific embodiment of the present disclosure, but the scope of protection of the present disclosure is not limited thereto, and any person skilled in the art may easily conceive of changing or replacing within the technical scope disclosed in the present disclosure and should be covered within the scope of protection of the present disclosure. Therefore, the protection scope of the present disclosure shall be subject to the protection scope of the claims.

What is claimed is:

1. A method for determining a time-domain resource, comprising:

receiving, by a network node, a first signaling sent by a base station, wherein the first signaling is used to configure at least one time-domain resource, the at least one time-domain resource comprises at least one of: at least one uplink time-domain resource for uplink forwarding or at least one downlink time-domain resource for downlink forwarding; and receiving, by the network node, a second signaling sent by the base station, wherein the second signaling is used to instruct the network node to perform forwarding on a first time-domain resource of the at least one time-domain resources; wherein spatial information corresponding to the first time-domain resource determined based on the second signaling overrides spatial information corresponding to a first time-domain resource determined based on the first signaling.

2. The method of claim 1, wherein the first signaling is further used to configure at least one of:

spatial information respectively corresponding to the at least one uplink time-domain resource;

spatial information respectively corresponding to the at least one downlink time-domain resource; or an association relationship between the at least one uplink time-domain resource and the at least one downlink time-domain resource, wherein an uplink time-domain resource and a downlink time-domain resource having the association relationship correspond to same or associated spatial information;

wherein the spatial information is one of: a beam index, a beam direction, a beam state, a transmission configuration, a transmission configuration indication, spatial-domain filtering information, or beam indication information.

3. The method of claim 1, further comprising:

reporting, by the network node, a first transmission configuration to the base station, wherein, the first transmission configuration is used to configure a number of beams or a number of spatial-domain filtering configurations of a distribute unit (DU) or a radio frequency unit; or the first transmission configuration is used to configure a number of beams for downlink beam scanning by the network node; or the first transmission configuration is used to configure a number of beams or a number of spatial-domain filtering configurations for serving users by the network node; or the first transmission configuration is used to configure a number of spatial-domain filtering configurations for downlink transmission or uplink transmission by the network node;

wherein the first transmission configuration is used for the base station to determine at least one of: the at least one uplink time-domain resource for the uplink forwarding or the at least one downlink time-domain resource for the downlink forwarding.

4. The method of claim 1, wherein a reference point or a calculation starting point of the first time-domain resource is a time-domain resource where the second signaling is located, or a time-domain resource obtained by adding an offset to the time-domain resource where the second signaling is located.

5. The method of claim 4, wherein the second signaling carries first information, the first information is used to indicate that a duration of an offset between the first time-domain resource and the time-domain resource where the second signaling is located is M time-domain resources, where M is an integer greater than or equal to 0.

6. The method of claim 5, wherein the duration is greater than or equal to at least one or a sum of more than one of: a processing time of the second signaling, a beam adjustment time, and a time for the network node to switch a working state.

7. The method of claim 1, wherein the second signaling carries third information, and the third information is used to indicate at least one of: spatial information or an uplink/downlink transmission direction corresponding to the first time-domain resource, wherein the spatial information is one of: a beam index, a beam direction, a beam state, a transmission configuration, a transmission configuration indication, spatial-domain filtering information, or beam indication information.

8. The method of claim 7, wherein the third information is used to indicate a second time-domain resource of the at least one time-domain resources, wherein the spatial information corresponding to the first time-domain resource is the same as spatial information corresponding to the second time-domain resource, and the uplink/downlink transmission direction corresponding to the first time-domain resource is the same as an uplink/downlink transmission direction corresponding to the second time-domain resource;

or, wherein the third information is used to indicate first spatial information among a plurality of pieces of spatial information supported by the network node, wherein the spatial information corresponding to the first time-domain resource is the first spatial information.

9. The method of claim 1, wherein the second signaling is further used to instruct the network node to perform forwarding on a third time-domain resource.

10. A method for determining a time-domain resource, comprising:

sending, by a base station, a first signaling to a network node, wherein the first signaling is used to configure at least one time-domain resource, the at least one time-domain resource comprises at least one of: at least one uplink time-domain resource for uplink forwarding or at least one downlink time-domain resource for downlink forwarding; and sending, by the base station, a second signaling to the network node, wherein the second signaling is used to instruct the network node to perform forwarding on a first time-domain resource of the at least one time-domain resources; wherein spatial information corresponding to the first time-domain resource determined based on the second signaling overrides spatial information corresponding to a first time-domain resource determined based on the first signaling.

11. The method of claim 10, wherein the first signaling is further used to configure at least one of:

spatial information respectively corresponding to the at least one uplink time-domain resource;

spatial information respectively corresponding to the at least one downlink time-domain resource; or an association relationship between the at least one uplink time-domain resource and the at least one downlink time-domain resource, wherein an uplink time-domain resource and a downlink time-domain resource with the association relationship correspond to same or associated spatial information;

wherein the spatial information is one of: a beam index, a beam direction, a beam state, a transmission configuration, a transmission configuration indication, spatial-domain filtering information, or beam indication information.

12. The method of claim 10, further comprising:

receiving, by the base station, a first transmission configuration reported by the network node, wherein, the first transmission configuration is used to configure a number of beams or a number of spatial-domain filtering configurations of a distribute unit (DU) or a radio frequency unit; or the first transmission configuration is used to configure a number of beams for downlink beam scanning by the network node; or the first transmission configuration is used to configure a number of beams or a number of spatial-domain filtering configurations for serving users by the network node; or the first transmission configuration is used to configure a number of spatial-domain filtering configurations for downlink transmission or uplink transmission by the network node;

wherein the first transmission configuration is used for the base station to determine at least one of: the at least one uplink time-domain resource for the uplink forwarding or the at least one downlink time-domain resource for the downlink forwarding.

13. The method of claim 10, wherein a reference point or calculation starting point of the first time-domain resource is a time-domain resource where the second signaling is located, or a time-domain resource obtained by adding an offset to the time-domain resource where the second signaling is located.

14. The method of claim 13, wherein the second signaling carries first information, the first information is used to indicate that a duration of an offset between the first time-domain resource and the time-domain resource where the second signaling is located is M time-domain resources, where M is an integer greater than or equal to 0.

15. The method of claim 14, wherein the duration is greater than or equal to at least one or a sum of more than one of: a processing time of the second signaling, a beam adjustment time, and a time for the network node to switch a working state.

16. The method of claim 10, wherein the second signaling carries third information, and the third information is used to indicate at least one of: spatial information or an uplink/downlink transmission direction corresponding to the first time-domain resource, wherein the spatial information is one of: a beam direction, a beam state, a transmission configuration, a transmission configuration indication, spatial-domain filtering information, or beam indication information.

17. The method of claim 16, wherein the third information is used to indicate a second time-domain resource of the at least one time-domain resources, wherein the spatial information corresponding to the first time-domain resource is the same as spatial information corresponding to the second time-domain resource, and the uplink/downlink transmission direction corresponding to the first time-domain resource is the same as an uplink/downlink transmission direction corresponding to the second time-domain resource;

or, wherein the third information is used to indicate first spatial information among a plurality of pieces of spatial information supported by the network node, wherein the spatial information corresponding to the first time-domain resource is the first spatial information.

18. The method of claim 10, wherein the second signaling is further used to instruct the network node to perform forwarding on a third time-domain resource.

19. A communication device, comprising a processor and a memory, wherein the memory is configured to store a computer program, and the processor is configured to call and execute the computer program stored in the memory, to perform the method of claim 1.

* * * * *